United States Patent
Yun et al.

(10) Patent No.: US 8,646,561 B2
(45) Date of Patent: Feb. 11, 2014

(54) ASSEMBLING STRUCTURE FOR WHEEL AND HUB OF ELECTRIC BICYCLE

(75) Inventors: Hongshik Yun, Seoul (KR); Jaehyun Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 15 days.

(21) Appl. No.: 13/307,912

(22) Filed: Nov. 30, 2011

(65) Prior Publication Data

US 2012/0133195 A1     May 31, 2012

(30) Foreign Application Priority Data

Nov. 30, 2010   (KR) .................. 10-2010-0120289

(51) Int. Cl.
*B60K 7/00*     (2006.01)

(52) U.S. Cl.
USPC .................. 180/220; 180/65.51; 301/111.02; 301/110.5; 301/105.1

(58) Field of Classification Search
USPC .................. 301/11.02, 110.5, 105.1, 111.01, 301/111.011; 180/65.51, 218, 220
See application file for complete search history.

(56) References Cited

U.S. PATENT DOCUMENTS

| | | | |
|---|---|---|---|
| 4,567,973 A * | 2/1986 | Butz ............................... | 192/64 |
| 7,351,171 B2 * | 4/2008 | Kanehisa et al. ............. | 474/160 |
| 7,717,447 B2 * | 5/2010 | Orford ........................ | 280/250.1 |
| 7,749,121 B2 * | 7/2010 | Perng ............................... | 475/5 |
| 7,891,745 B2 * | 2/2011 | Nagao et al. .................... | 301/59 |
| 2002/0020984 A1 * | 2/2002 | Dunkley ....................... | 280/215 |
| 2005/0167171 A1 * | 8/2005 | Katsaros ...................... | 180/65.5 |
| 2006/0220444 A1 * | 10/2006 | Darnell .................... | 301/111.01 |
| 2008/0129107 A1 * | 6/2008 | Hodgson .................... | 301/110.5 |
| 2011/0084544 A1 * | 4/2011 | Thorpe ...................... | 301/110.5 |
| 2011/0133542 A1 * | 6/2011 | Ratti et al. ...................... | 301/6.5 |
| 2011/0259658 A1 * | 10/2011 | Huang et al. ............... | 180/65.51 |

* cited by examiner

*Primary Examiner* — John Walters
*Assistant Examiner* — Brian Swenson
(74) *Attorney, Agent, or Firm* — Saliwanchik, Lloyd & Eisenschenk

(57) ABSTRACT

An assembling structure for wheel and hub of an electric bicycle is disclosed, the structure capable of firmly assembling a hub and a wheel by separately manufacturing the hub embedded with a motor and a transmission gear box from the wheel, the structure including a hub accommodating a motor therein, a wheel coupled to one side of the wheel by way of a sliding fit, a groove unit circumferentially arranged at a periphery of the hub, and a lug unit formed at an area coupled to the hub of the wheel and meshed with the groove unit to allow the wheel to rotate with the hub, whereby coupling of the wheel and the hub is simplified to reinforce the coupling force therebetween.

5 Claims, 2 Drawing Sheets

ASSEMBLING STRUCTURE FOR WHEEL AND HUB OF ELECTRIC BICYCLE

CROSS-REFERENCE TO RELATED APPLICATION

This application claims the benefit under 35 U.S.C. §119 of Korean Patent Application No. 10-2010-0120289, filed Nov. 30, 2010, which is hereby incorporated by reference in its entirety.

BACKGROUND

1. Field of the Disclosure

Exemplary embodiments of the present disclosure may relate to an assembling structure for wheel and hub of an electric bicycle, and more particularly to an assembling structure for wheel and hub of an electric bicycle capable of firmly assembling a hub and a wheel by separately manufacturing the hub embedded with a motor and a transmission gear box from the wheel.

2. Discussion of the Related Art

A typical bicycle has two wheels and a pair of rotatable pedals, and is propelled by a rider via the pedals. Due to the levels of physical exertion required, such bicycles are typically used to travel only short distances.

Bicycles have been a form of transportation for many years and in some countries, the main mode of transportation. In more recent times, bicycles have been equipped with means to reduce the amount of energy required by the rider to propel the bicycle, such as by adding electric drives.

Prior art electric drives for bicycles can be divided into various categories such as a friction drive on the bicycle wheel; an electric through the pedal shaft to the rear wheel; an electric through the chain to the rear wheel; an electric drive through a freewheeling sprocket (chain or gear); a direct drive to the rear wheel; or a wheel hub motor. While electric vehicles may be gaining in popularity, many aspects of electric vehicle technology still may carry drawbacks capable of improvement.

While transmissions (changing the ratio of motor to wheel revolutions) may be effective at adapting a motor to varying torque requirements, they often may require more mechanical devices to provide the variable coupling and thus may require a shifting mechanism. Such a system may be relatively complex and mechanical in design.

Recently, a method of embedding a motor and a transmission gear box (hereinafter referred to simply as "transmission") in a hub forming a front wheel axel or a rear wheel axle has been proposed.

FIG. 1 is a perspective view illustrating a configuration in which a hub and a wheel are integrally manufactured according to prior art.

A hub (1) accommodates a motor and/or a transmission therein and is protruded at one side thereof with a rotation shaft (30). The rotation shaft (30) is connected to a frame (not shown) to rotate the hub (1) and a wheel (2) in association with rotation of the motor, whereby a bicycle can be moved.

Meantime, one side of the hub (1) may be coupled with a disc panel (not shown), which is a device for generating a braking power using a hydraulic pressure disc pad (not shown). The disc panel may use a drum braking method, or may use a wire strength braking method.

The hub (1) generally accommodates a motor for generating a rotary power by an electromagnetic interaction, and a transmission, and is made of a metal, particularly aluminum, for quickly transmitting a heat. The wheel (2) is generally formed with the same material as that of hub, which however creates a disadvantage of increasing an overall weight of wheels that generates power. In this case, the increased weight goes against the current trend that puts an external look ahead of everything, and may create a problem of replacing an entire part if the wheel is damaged.

It would be beneficial to have an electric bicycle that is relatively simple, is small and light enough in weight to be highly portable, and has a useful range of travel between required battery charges.

BRIEF SUMMARY

The present disclosure is directed to solving the disadvantages by providing an assembling structure for wheel and hub of electric bicycle in which a wheel and a hub are coupled and formed with mutually different materials, to thereby make the electric bicycle relatively light, strong and well-coupled.

Technical subjects to be solved by the present disclosure are not restricted to the above-mentioned description, and any other technical problems not mentioned so far will be clearly appreciated from the following description by the skilled in the art.

In one general aspect of the present disclosure, there is provided an assembling structure for wheel and hub of electric bicycle, the structure comprising: a hub accommodating a motor therein; a wheel coupled to one side of the wheel by way of a sliding fit; a groove unit circumferentially arranged at a periphery of the hub; and a lug unit formed at an area coupled to the hub of the wheel and meshed with the groove unit to allow the wheel to rotate with the hub. Therefore, coupling of the wheel and the hub is simplified to reinforce the coupling force therebetween.

Preferably, the wheel includes an outer wheel coupled to a tire, an inner wheel inserted into the hub, and a spoke connecting the outer wheel and the inner wheel, and the lug unit is circumferentially arranged at an inner surface of the inner wheel.

Preferably, the structure further includes a hitching unit protruded to an inner circumferential direction at a distal end of the inner wheel; and a step portion protrusively formed to a circumferential direction of the hub at the groove unit, and hitched by the hitching unit to restrict an axial movement relative to the hub of the wheel. Therefore, a coupling force between the hub and the wheel to an axial direction can be excellently reinforced.

Preferably, the hub further includes a rotation shaft protruded to one side and coupled to a body of the electric bicycle.

Preferably, the hub further includes a disc panel coupled to a distal end thereof, and the disc panel is coupled to one side of the hub after one side of the wheel is insertedly coupled to the hub.

Preferably, the hub is formed with a metal material, while the wheel is formed with a carbon material. Therefore, an entire weight of the hub can be light to provide a freedom in selecting a material.

Preferably, the groove unit and the lug unit are coupled by bonding. Therefore, the coupling force between the hub and the wheel can be further reinforced.

In another general aspect of the present disclosure, there is provided an assembling structure for wheel and hub of electric bicycle, the structure comprising: a hub accommodating a motor therein and circumferentially formed with a gear-shaped concave groove; and a wheel, a center of which is insertedly penetrated by the hub, the wheel formed with a gear-shaped concave groove to provide a coupling force to a rotational direction by being meshed with the concave groove, wherein the hub is axially coupled to the center of the wheel in a sliding fit. Therefore, the hub and the wheel are integrally rotated to provide a firm coupling force and an easy coupling therebetween.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

The assembling structure for wheel and hub of electric bicycle according to the present disclosure thus configured has an advantageous effect in that the hub and the wheel are coupled by a sliding fit, and the wheel includes a concave groove for meshing the wheel and the hub to provide an excellent mechanical coupling force and simplify the coupling between the hub and the wheel.

The assembling structure for wheel and hub of electric bicycle according to the present disclosure thus configured has another advantageous effect in that materials for hub and wheel can be selectively formed to provide a beautiful external look and lightness of the electric bicycle.

BRIEF DESCRIPTION OF THE DRAWINGS

Accompanying drawings are included to provide a further understanding of arrangements and embodiments of the present disclosure and are incorporated in and constitute a part of this application.

Figure 1:
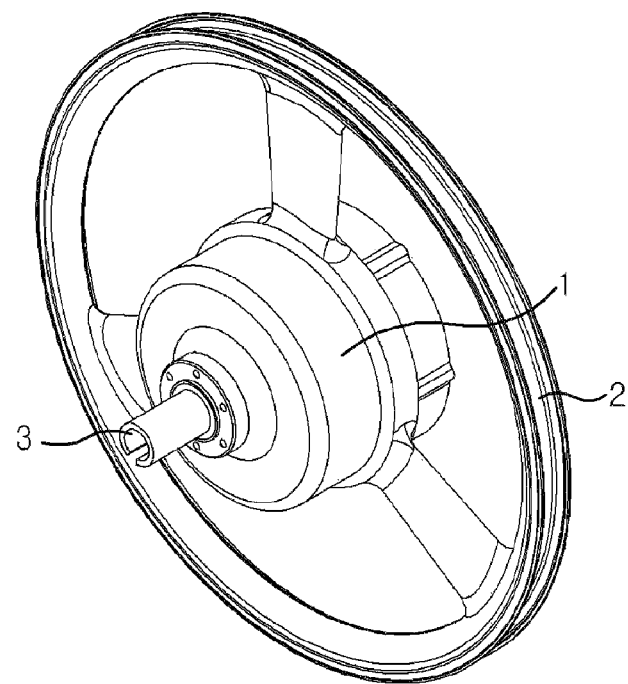
FIG. 1 is a perspective view illustrating a configuration in which a hub and a wheel are integrally manufactured according to prior art.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the method particularly pointed out in the written description and claims hereof as well as the appended drawings.

DETAILED DESCRIPTION

Hereinafter, exemplary embodiments of the present disclosure are described in detail with reference to the accompanying drawings. It will be appreciated that for simplicity and/or clarity of illustration, elements illustrated in the figure have not necessarily been drawn to scale. For example, the dimensions of some of the elements may be exaggerated relative to other elements for clarity. Further, if considered appropriate, reference numerals have been repeated among the figures to indicate corresponding and/or analogous elements.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements.

Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In the following description and/or claims, the terms "comprise" and "include," along with their derivatives, may be used and are intended as synonyms for each other. Furthermore, the terms "including", "includes", "having", "has", "with", or variants thereof are used in the detailed description and/or the claims to denote non-exhaustive inclusion in a manner similar to the term "comprising".

Now, the assembling structure for wheel and hub of electric bicycle according to the present disclosure will be described in detail with reference to the accompanying drawings.

Figure 2:
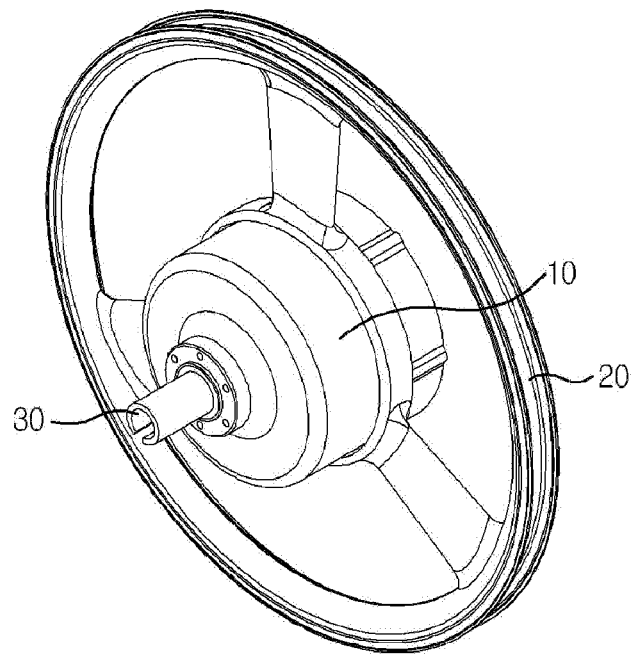
FIG. 2 is a perspective view illustrating a state in which a hub and a wheel of electric bicycle are coupled according to the present disclosure.

FIG. 2 is a perspective view illustrating a state in which a hub and a wheel of electric bicycle are coupled according to the present disclosure.

According to the concept of the present disclosure, a hub (10) and a wheel (20) are manufactured in separate parts, where the wheel (20) is coupled from a distal end of the hub (10) to a periphery of the hub (10) by way of sliding fit.

The hub (10) includes therein a motor and/or a transmission, where the electric bicycle can be advanced by rotation of the wheel through electromagnetic interaction.

The motor accommodated inside the hub is formed with a rotation shaft (30) protruded to one side of the hub (10), where the rotation shaft (30) is coupled to a body (not shown) of the electric bicycle to allow the hub (10) and the wheel (20) to integrally rotate relative to the rotation shaft (30).

The wheel (20) is coupled from a distal end of he hub (10) to a periphery of the hub (10) by way of sliding fit according to the concept of the present disclosure.

Hereinafter, a direction of the hub (10) slidingly coupled by the wheel (20) is defined as one side or one distal end, and an area opposite to an axial direction is defined as the other side or the other distal end.

After the wheel (20) is coupled to one side of the hub (10), a disc panel (not shown) may be coupled to one distal end side of the hub (10), where the disc panel is a device generating a braking power via hydraulic pressure. However, it should be apparent that a device generating a braking power may include various devices using a drum braking method and a wire, for example.

Figure 3:
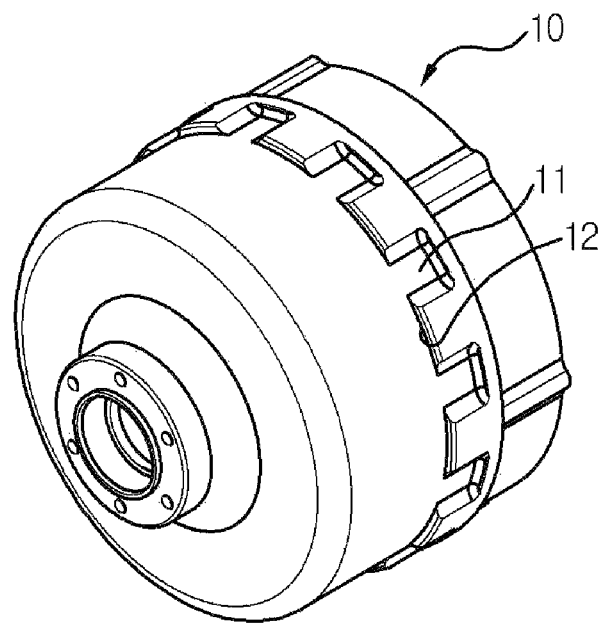
FIG. 3 is a perspective view illustrating a hub of electric bicycle according to the present disclosure.

FIG. 3 is a perspective view illustrating a hub of electric bicycle according to the present disclosure.

The hub (10) is a kind of housing with a substantially cylindrical shape that accommodates a motor and/or a transmission therein, and is formed with a metal material with a high thermal conductivity. Preferably, the hub is manufactured with aluminum or an aluminum alloy.

The hub (10) is circumferentially arranged with groove units (11) to integrally rotate with the wheel (20) by being coupled to the wheel (20). The groove units (11) are arranged to the periphery of the hub (10), each spaced apart at a predetermined interval, and functions to maintain a mutual, mechanical coupling power to a rotational direction by being meshed with a lug unit (described later) of the wheel.

Each of the groove units (11) may take a concave shape at the periphery of the hub (10), but each of the groove unit (11) is exemplarily illustrated in FIG. 3 as being formed with a step portion (12) elevated from a predetermined area to a peripheral direction, and being formed with a groovy shape between the step portions (12). The step portion (12) is hitched by a hitching unit (described later, 25 of FIG. 4) of the wheel to function as a stopper that restricts an axial movement of the wheel (20).

Meanwhile, the other distal end side of the groove unit (11) is formed with a staircase as that of the step portion (12) and hitched by the other distal end of the lug unit (24) at the wheel to restrict the axial movement of the wheel (20).

Figure 4:
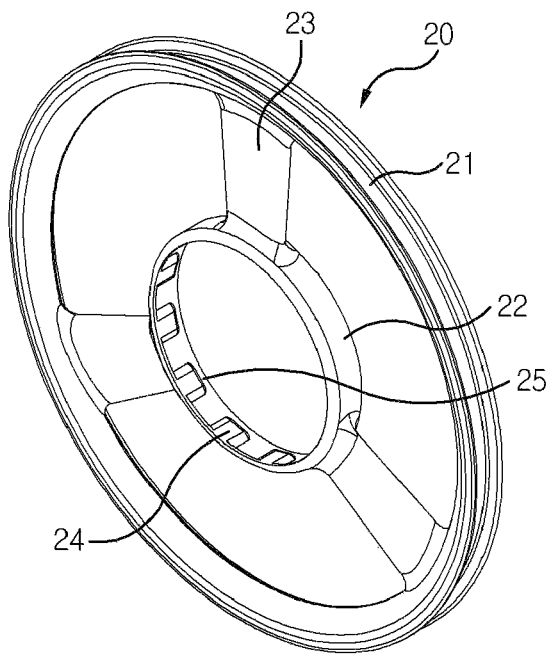
FIG. 4 is a perspective view illustrating a wheel of electric bicycle according to the present disclosure.

FIG. 4 is a perspective view illustrating a wheel of electric bicycle according to the present disclosure.

The wheel (20) includes an outer wheel (21) supporting the electric bicycle, an inner wheel (22) coupled to the hub (10), and a spoke (23) connecting the outer wheel (21) and the inner wheel (22).

Each of the outer wheel (21) and the inner wheel (22) takes the shape of a ring. Although FIG. 4 exemplarily illustrates that the inner wheel and the outer wheel are separated, it should be apparent that the outer wheel and the inner wheel may be integrally formed in the shape of a disc.

The inner wheel (22) is directly coupled to the periphery of the hub (10) and formed with a lug unit (24) that is to be meshed at an inner circumferential surface with the groove unit (11 of FIG. 3).

The lug unit (24) is protruded in the shape of a gear and arranged from the inner circumferential surface of the inner wheel (22) to the circumferential direction. It should be noted that the one side and the other side are reversely illustrated in FIG. 4 over those of FIGS. 2 and 3 in order to provide a clear understanding.

The lug unit (24) is formed in a protruding opposite shape at an inner circumferential surface of the wheel (20) to that of the groove unit (11) of the hub (10). Thus, the lug unit (24) of the wheel (20) and the groove unit (11) of the hub (10) are meshed to provide a mechanical coupling power to a rotational direction, where the hub (10) and the wheel (20) can be integrally rotated in association with rotation of the motor.

However, although the exemplary embodiment of the present disclosure has illustrated a case where the lug unit (24) is formed at the wheel, and the groove unit (11) is formed at the hub, it should be apparent that an alternatively formed concave groove unit may be formed, the groove unit may be formed at the wheel and the lug unit may be formed at the hub. Furthermore, it should be also apparent that, in addition to the gear shape arranged in the same interval to the circumferential direction, any types of forms may be adequately applied as long as the rotary power can be transmitted to the circumferential direction.

Meanwhile, one side of the wheel (20) is formed with a hitching unit (25) protrusively formed to the inner circumferential direction of the inner wheel (22). The hitching unit (25) is hitched by the step portion (12) of the hub to function as a stopper that restricts the wheel (20) to move to the other side from the periphery of the hub (10).

Although the hitching unit (25) is protrusively formed to the inner circumferential direction of the inner wheel (22), it should be apparent that the protruding shape of the hitching unit (25) may preferably and adequately be changed as long as the step portion (12) can be hitched.

As the wheel and the hub are coupled as configured as noted above, the coupling power or force between the hub and the wheel can be firmly maintained, whereby the wheel and the hub can be integrally rotated. To be more specific, the lug unit (24) and the groove unit (11) are meshed and mechanically coupled to transmit a force to a rotational direction, and the step portion (12) is hitched by the hitching unit (25) to restrict movement of wheel (20) to an axial direction of the other side.

Although the wheel (20) is press-fitted to one side of the hub (10) to allow the groove unit (11) and the hitching unit (25) to be meshed, thereby restricting movement to an axial direction, there arises a need to mechanically restrict the wheel (20) from moving the one side which is the wheel-coupling direction.

Thus, it is preferable that a coupling force be reinforced between the groove unit (11) and the lug unit (24) or between the hitching unit (25) and the step portion (12) by way of bonding method.

Although a strong force is received to a rotational direction in a coupling relation between the hub (10) and the wheel (20) in the operational process of the electric bicycle, there is relatively a weak force to the axial direction, such that it should be noted that even the coupling force by way of bonding can sufficiently realize a support to the axial direction.

Meanwhile, as noted above, although the hub (10) must be manufactured with a metal material for thermal transmission and protection of parts, the wheel (20) is preferably manufactured with a light material including, but not limited to carbon.

As expounded in the above, the prior art has experienced a difficulty in forming the wheel and the hub in different materials to increase an overall weight of the electric bicycle. According to the concept of the present disclosure, even if the wheel and the hub are formed with different materials in mechanical coupling between the wheel and the hub, there is an advantage in the present disclosure in that an excellent coupling force can be realized to allow the wheel to be manufactured with various materials.

It should be noted that, although the exemplary embodiments of the present disclosure have described and explained the wheel and the hub of the electric bicycle, the present inventive concept can be easily applied to an electric scooter or a kick board where a motor is accommodated in a hub to provide a power thereto.

That is, the above-mentioned assembling structure for wheel and hub of electric bicycle according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. An assembling structure for a wheel and hub of an electric bicycle, the structure comprising:
   a hub accommodating a motor therein and having a rotation shaft protruded to one side and coupled to a body of the electric bike;
   a wheel coupled to one side of the hub by way of a sliding fit wherein the wheel includes an outer wheel coupled to a tire, an inner wheel, and a spoke connecting the outer wheel and the inner wheel, and wherein the hub is inserted into an axial hole of the inner wheel;
   a groove unit circumferentially arranged at a periphery of the hub; and
   a protrusion formed at an area coupled to the hub of the wheel and meshed with the groove unit to allow the wheel to rotate with the hub;
   a hitching unit protruded in an inner circumferential direction at a distal end of the inner wheel; and
   a step portion protrusively formed in a circumferential direction of the hub at the groove unit, and hitched by the hitching unit to restrict a rotational movement relative to the hub;
   wherein a coupling direction of the hitching unit and the step portion is parallel to the sliding fit direction of the hub.

2. The structure of claim 1, wherein the protrusion is circumferentially arranged at an inner surface of the inner wheel.

3. The structure of claim 1, wherein the hub is formed with a metal material, while the wheel is formed with a carbon material.

4. The structure of claim 1, wherein the groove unit and the protrusion are coupled by bonding.

5. An assembling structure for a wheel and hub of an electric bicycle, the structure comprising:
   a hub accommodating a motor therein, circumferentially formed with a gear like shaped concave groove, and having a rotation shaft protruded to one side and coupled to a body of the electric bicycle; and
   a wheel formed with a gear-shaped concave groove to provide a coupling force in a rotational direction by being meshed with the concave groove, wherein a center of the wheel is insertedly penetrated by the hub, wherein the hub is axially coupled to the center of the wheel in a sliding fit, wherein the wheel includes an outer wheel coupled to a tire, an inner wheel, and a spoke connecting the outer wheel and the inner wheel, and wherein the hub is inserted into an axial hole of the inner wheel;
   a hitching unit protruded in an inner circumferential direction at a distal end of the inner wheel; and
   a step portion protrusively formed in a circumferential direction of the hub at the gear like shaped concave groove, and hitched by the hitching unit to restrict a rotational movement relative to the hub;
   wherein a coupling direction of the hitching unit and the step portion is parallel to the sliding fit direction of the hub.

* * * * *